(12) United States Patent
Negishi

(10) Patent No.: US 10,003,715 B2
(45) Date of Patent: Jun. 19, 2018

(54) IMAGE PICKUP DEVICE AND IMAGING APPARATUS

(71) Applicant: CANON KABUSHIKI KAISHA, Tokyo (JP)

(72) Inventor: Norio Negishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/840,639

(22) Filed: Dec. 13, 2017

(65) Prior Publication Data

US 2018/0103175 A1    Apr. 12, 2018

Related U.S. Application Data

(63) Continuation of application No. 15/163,233, filed on May 24, 2016, now Pat. No. 9,894,237.

(30) Foreign Application Priority Data

May 29, 2015 (JP) ................................ 2015-109428
Apr. 22, 2016 (JP) ................................ 2016-086546

(51) Int. Cl.
| | |
|---|---|
| H04N 1/21 | (2006.01) |
| H04N 5/783 | (2006.01) |
| H04N 5/374 | (2011.01) |
| H04N 5/77 | (2006.01) |
| H04N 5/378 | (2011.01) |
| H04N 5/232 | (2006.01) |
| H04N 5/3745 | (2011.01) |

(52) U.S. Cl.
CPC ......... *H04N 1/212* (2013.01); *H04N 5/23293* (2013.01); *H04N 5/378* (2013.01); *H04N 5/3742* (2013.01); *H04N 5/37455* (2013.01); *H04N 5/772* (2013.01); *H04N 5/783* (2013.01); *H04N 2201/0084* (2013.01)

(58) Field of Classification Search
CPC ............. H04N 5/23293; H04N 5/3742; H04N 5/37455; H04N 5/378; H04N 5/772; H04N 5/783; H04N 1/212; H04N 2201/0084

See application file for complete search history.

(56) References Cited

U.S. PATENT DOCUMENTS

| | | |
|---|---|---|
| 7,110,025 B1 | 9/2006 | Loui et al. |
| 2006/0268117 A1 | 11/2006 | Loui et al. |
| 2009/0273684 A1 | 11/2009 | Sambonsugi |
| 2009/0295931 A1 | 12/2009 | Cho |

(Continued)

FOREIGN PATENT DOCUMENTS

| | | |
|---|---|---|
| JP | 2001-111934 A | 4/2001 |
| JP | 2001-177746 A | 6/2001 |

(Continued)

*Primary Examiner* — Tuan Ho
(74) *Attorney, Agent, or Firm* — Canon U.S.A., Inc. IP Division

(57) ABSTRACT

In an image pickup device internally including a memory unit and a computing processing unit, image signals of a moving image are resized and are generated from image signals of still images, and the image signals of the still images are stored in the memory unit, and, after the image signals of the moving image are all transferred externally from the image pickup device, the image signals of the still images are transferred.

31 Claims, 14 Drawing Sheets

(56) References Cited

U.S. PATENT DOCUMENTS

| | | |
|---|---|---|
| 2011/0102616 A1 | 5/2011 | Migiyama et al. |
| 2013/0188921 A1* | 7/2013 | Kuriyama |
| 2017/0230629 A1* | 8/2017 | Kosakai ............... G11B 31/006 |
| 2018/0054566 A1* | 2/2018 | Yaguchi ............. H04N 5/23229 |

FOREIGN PATENT DOCUMENTS

| | | |
|---|---|---|
| JP | 2006-311347 A | 11/2006 |
| JP | 2013-026675 A | 2/2013 |
| JP | 2013-106230 A | 5/2013 |
| JP | 2015-041792 A | 3/2015 |

\* cited by examiner

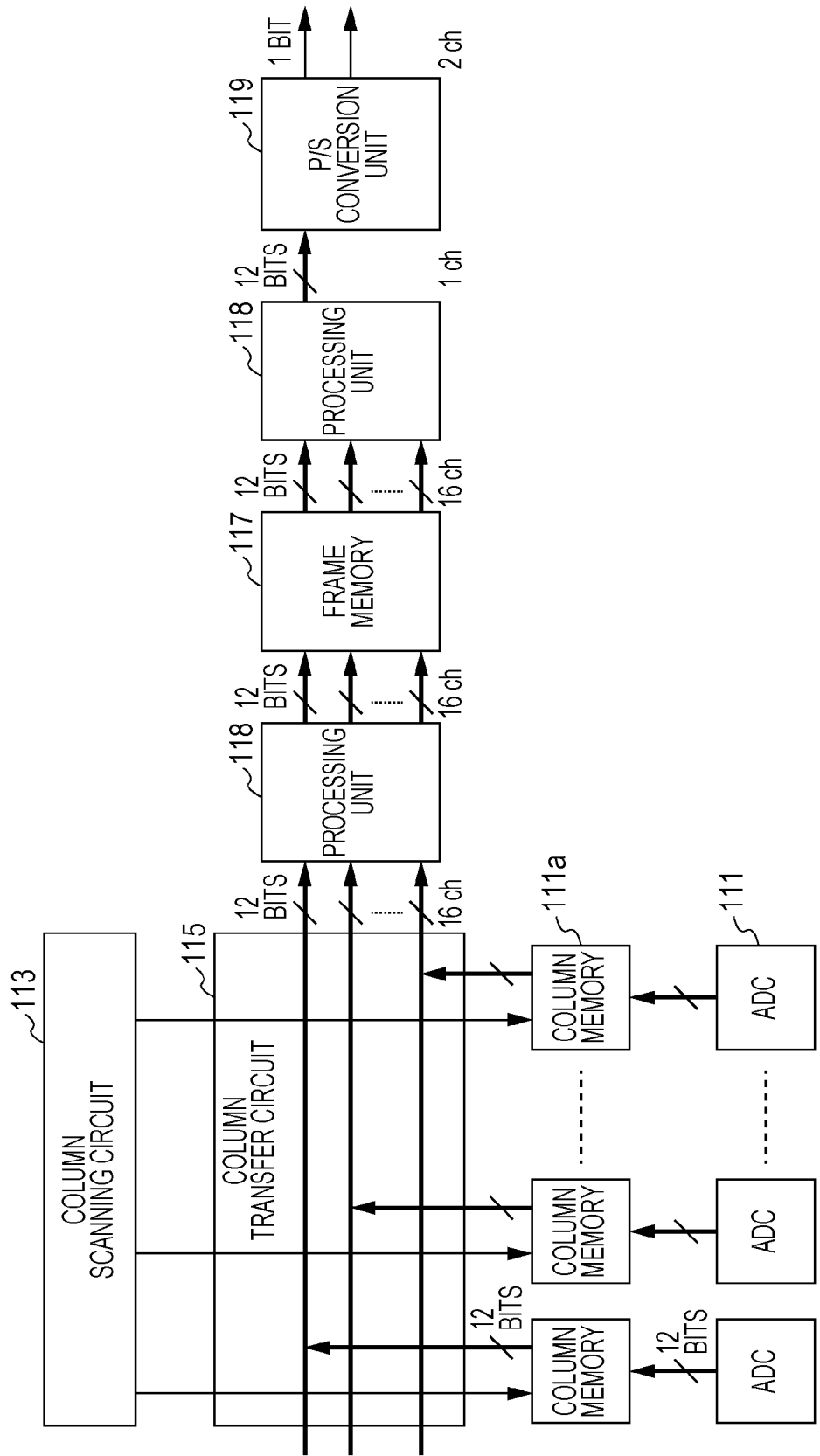

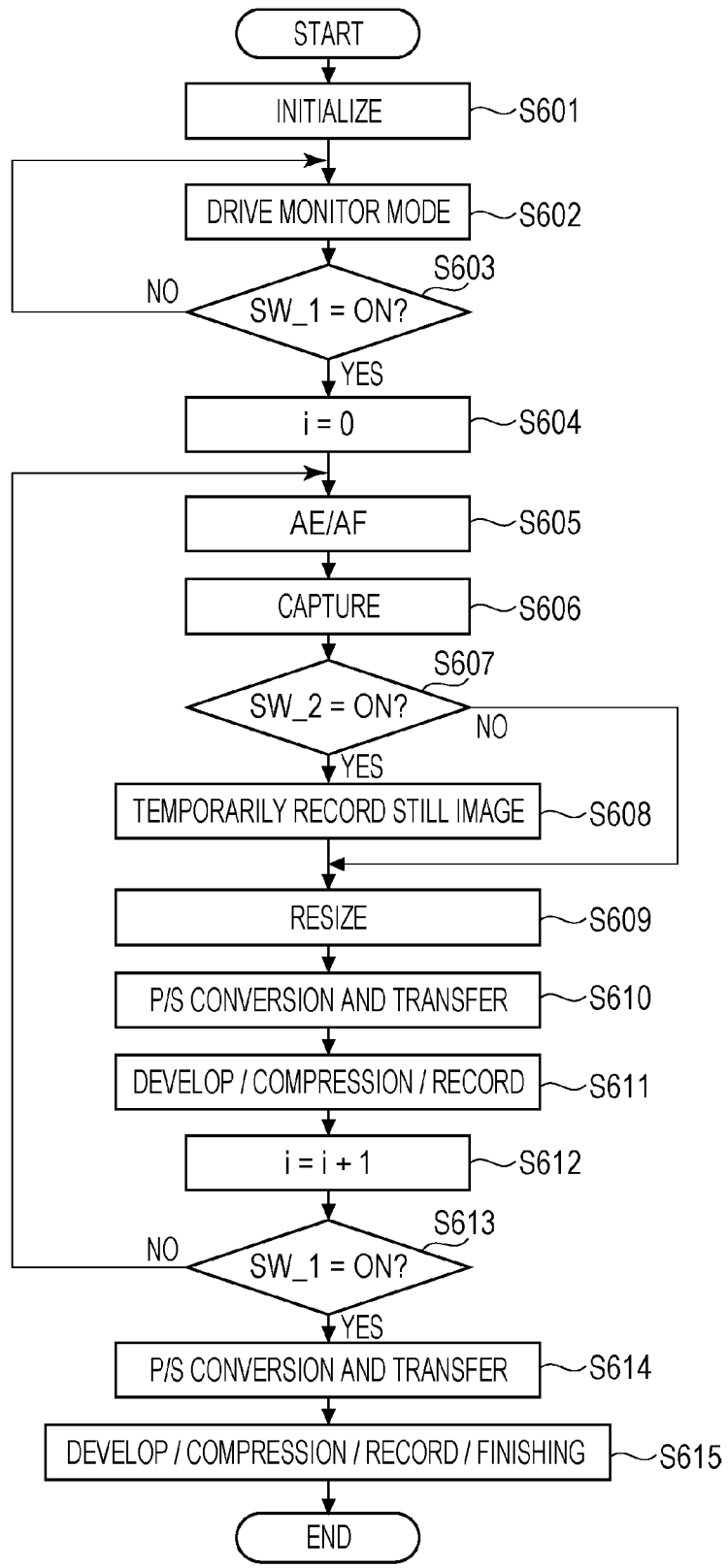

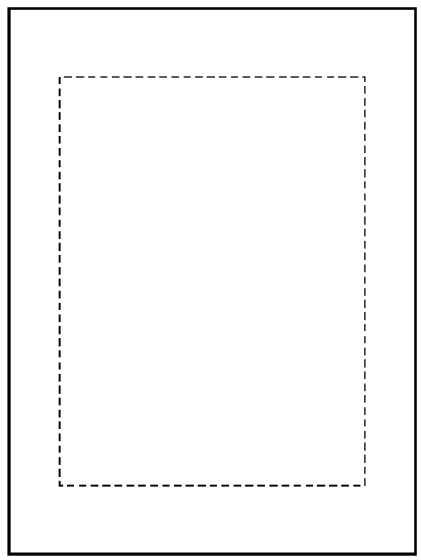

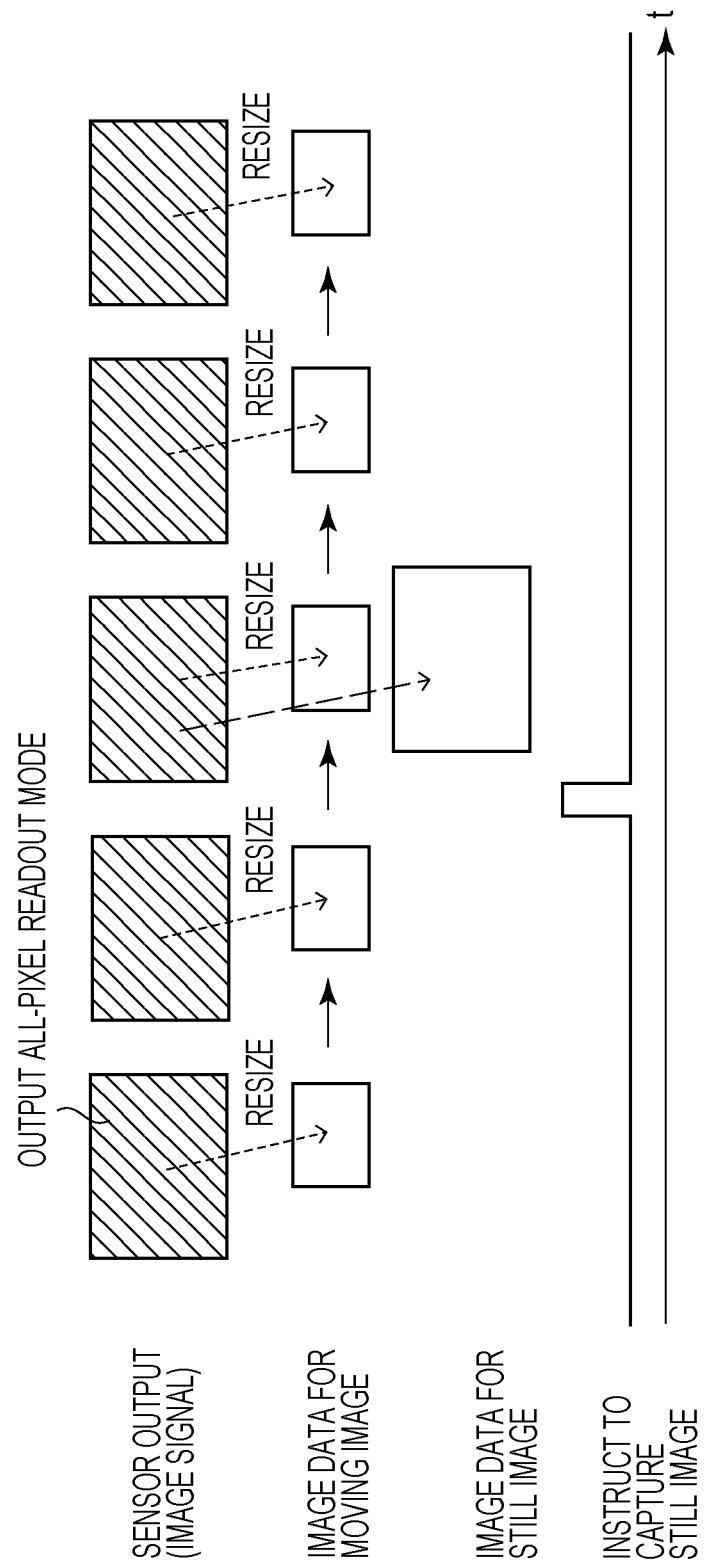

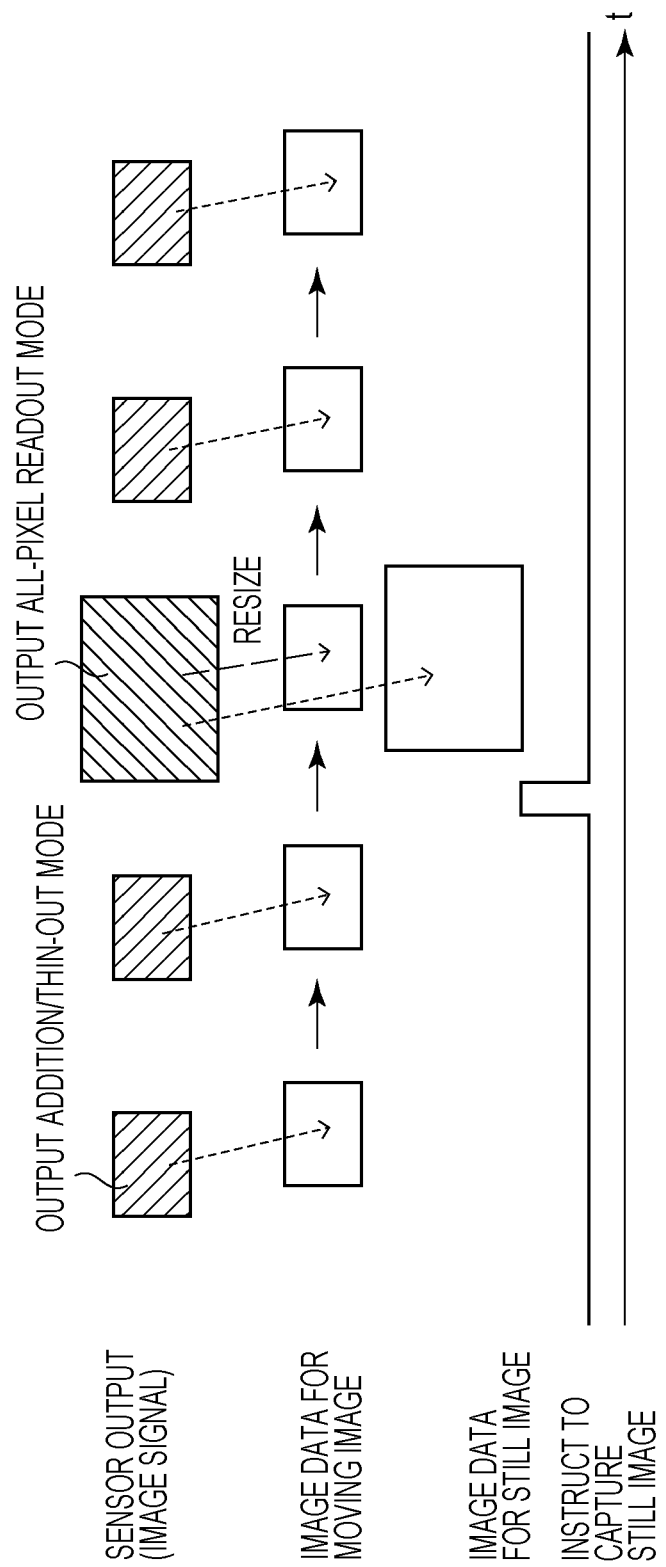

IMAGE PICKUP DEVICE AND IMAGING APPARATUS

CROSS-REFERENCE TO RELATED APPLICATIONS

This application is a Continuation of U.S. application Ser. No. 15/163,233, filed May 24, 2016, which claims priority from Japanese Patent Application No. 2015-109428 filed May 29, 2015, which claims priority from Japanese Patent Application No. 2016-086546 filed Apr. 22, 2016, which are hereby incorporated by reference herein in their entireties.

BACKGROUND OF THE INVENTION

Field of the Invention

The present invention relates to an image pickup device and an imaging apparatus.

Description of the Related Art

In recent years, as disclosed in Japanese Patent Laid-Open No. 2013-26675, a CMOS image pickup device, for example for use in an imaging apparatus such as a digital camera, may include an increased number of pixels because of miniaturization of pixels, and is capable of capturing high-definition images. Recent imaging apparatuses for consumers may generally include 10 million pixels or more.

FIG. 14 is a configuration block diagram of such a general imaging apparatus. Referring to FIG. 14, an image pickup device 1500 includes a pixel part 1501, an analog to digital (AD) conversion unit 1502, and a P/S conversion unit 1503. The pixel part 1501 converts a subject image to an electrical signal and outputs it to the AD conversion unit 1502.

The AD conversion unit 1502 converts an image signal read from the pixel part 1501 to a digital signal. The P/S conversion unit 1503 performs parallel-serial conversion on the digital signal converted by the AD conversion unit 1502. An image signal processing circuit 1600 performs a signal process on an image signal from the image pickup device 1500.

The imaging apparatus has a transfer path having a constant transfer capability for transferring an image signal from the image pickup device 1500 to the image signal processing circuit 1600. Thus, an increased number of pixels in the image pickup device may relatively result in an increased transfer time of all image signals of a subject.

In other words, the speed for reading signals from the image pickup device 1500 to the image signal processing circuit 1600 may be a bottleneck in the speed for reading out image signals. Furthermore, such high speed transfer may increase the amount of power consumed and the amount of heat generated by the transfer circuit and the processing circuit, which may reduce the precision of the data transfer.

SUMMARY OF THE INVENTION

The present invention provides an image pickup device which can provide both of seamless moving images and high quality still images in a case where the image pickup device has a large number of pixels for performing still image recording while video recording is being performed.

An image pickup device according to an aspect of the present invention includes an imaging unit configured to receive and photoelectrically convert incident light, an analog to digital conversion unit configured to convert an analog image signal output from the imaging unit to digital image data, a storage unit configured to store digital image data of at least one frame converted by the analog to digital conversion unit, and a generating unit configured to generate digital image data of a moving image from digital image data of a still image. In a case where a still image is captured while a moving image is being captured by using the image pickup device, the digital image data of the still image are stored in the storage unit, and the digital image data of the moving image are output before the digital image data of the still image.

An image pickup device according to another aspect of the invention includes an imaging unit configured to receive and photoelectrically convert incident light, a storage unit configured to store image data output from the imaging unit, and a computing unit configured to perform a computing process on the image data. In a case where image data of a first size are being output while image data of a second size different from the first size are being output, one of the image data is stored in the storage unit.

Further features of the present invention will become apparent from the following description of exemplary embodiments with reference to the attached drawings.

BRIEF DESCRIPTION OF THE DRAWINGS

FIG. 2 illustrates an example of a data bus configuration according to the first embodiment.

FIG. 7 is a flowchart illustrating a photographic sequence according to the first embodiment.

FIGS. 8A1 to 8A3 and FIGS. 8B1 and 8B2 illustrate resize processing to be performed on an image according to an embodiment.

FIG. 9 illustrates an outline of image data size changing processing according to the first embodiment.

FIG. 10 illustrates an outline of image data size changing processing according to the first embodiment.

DESCRIPTION OF THE EMBODIMENTS

Embodiments of the present invention will be described in detail below with reference to the attached drawings. Each of the embodiments of the present invention described below can be implemented solely or as a combination of a plurality of the embodiments or features thereof where necessary or where the combination of elements or features from individual embodiments in a single embodiment is beneficial.

First Embodiment

According to a first embodiment, an imaging system will be described which has a photographing mode enabling to capture a still image while video recording is being performed. According to this embodiment, an image pickup device performs a photographing operation always in an all pixel readout mode and generates both of a moving image and a still image from image signals driven and output in the all pixel readout mode.

Figure 1:
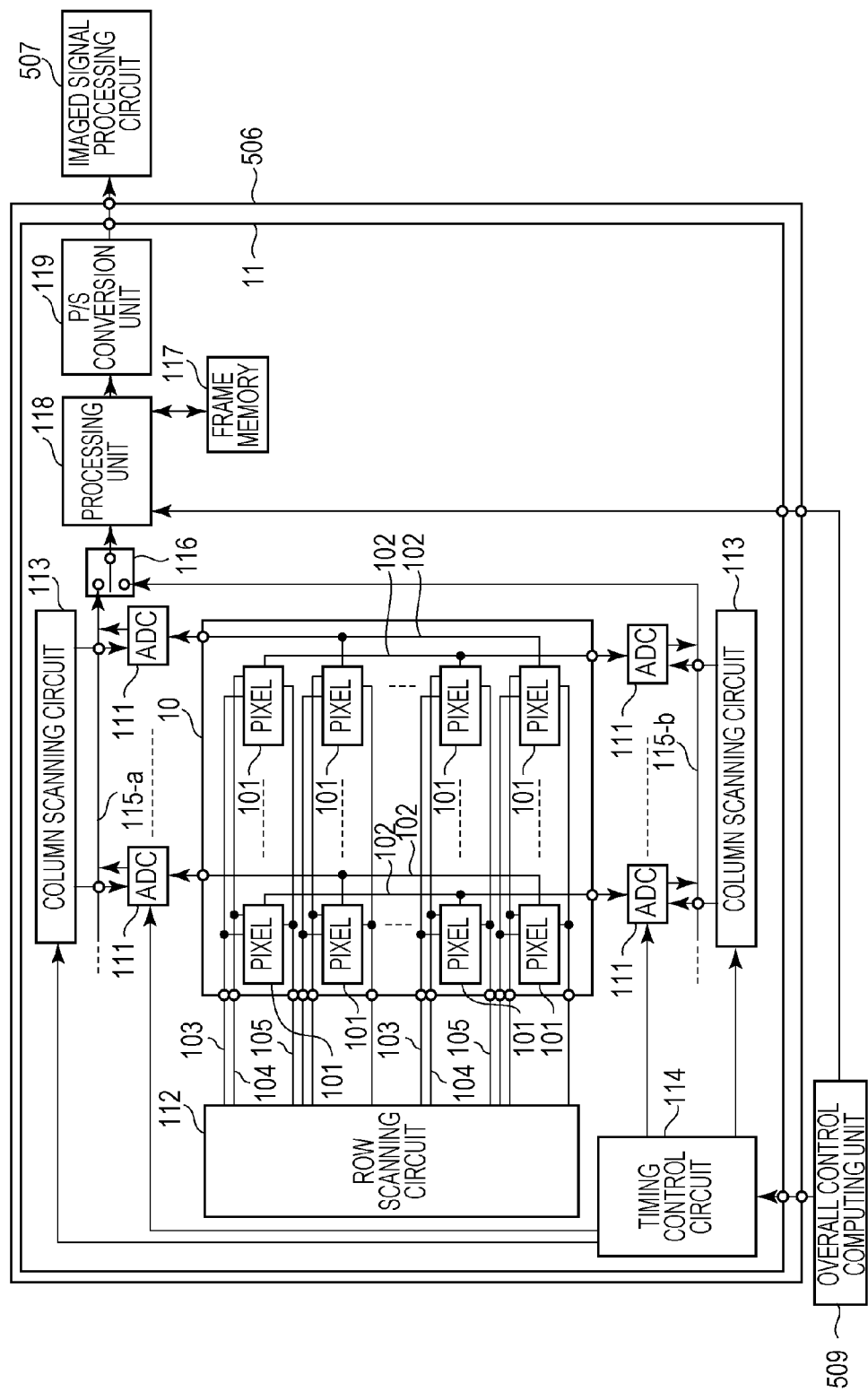
FIG. 1 illustrates a schematic structure of an image pickup device according to a first embodiment.

FIG. 1 is a block diagram schematically illustrating an image pickup device according to the first embodiment of the present invention.

An image pickup device 506 has a first chip (first semiconductor substrate) 10 and a second chip (second semiconductor substrate) 11, and the second chip 11 and the first chip 10 are mutually stacked. The first chip 10 has a pixel part having a plurality of pixels 101 arranged in a matrix form and is provided on a light entrance side (or side for receiving light of an optical image) relative to the second chip 11.

In the pixel part of the first chip 10, the plurality of pixels 101 arranged in a matrix form are connected row by row to a transfer signal line 103, a reset signal line 104, and a row select signal line 105 and are connected column by column to a plurality of column output lines 102. Pixels located in different readout rows of one same column are connected to corresponding one of a plurality of column output lines 102 each provided for one column.

The second chip 11 has a plurality of AD converters (hereinafter, each called an ADC) 111 each provided for one column, a row scanning circuit 112, a column scanning circuit 113, and a timing control circuit 114. The second chip 11 has a changeover switch 116, a frame memory 117, a processing unit 118, a parallel-serial conversion unit (hereinafter, called a P/S conversion unit) 119 and so on. The timing control circuit 114 is drive-controlled by an overall control computing unit 509.

Because of the first chip 10 having the pixel part and the second chip 11 having the drive circuit for the pixel part, the memory, the computing unit and so on, manufacturing processes may be divided into an imaging layer and a circuit layer of the image pickup device 506. Then, thinning and densification of lines in the circuit layer can increase the speed, reduce the size and improve the functionality.

The changeover switch 116 selectively inputs digital image data of each channel output from a horizontal signal line 115-a and horizontal signal line 115-b provided for each channel to the processing unit 118. The processing unit 118 sorts image data of the channels, generates image data of each one frame and sequentially outputs it to the frame memory 117. The frame memory 117 temporarily stores digital image data of at least one output frame.

The processing unit 118 performs computing processes such as a cut-out process and a thin-out process on digital image data of one frame stored in the frame memory 117. Details thereof will be described later. The digital image data of one frame processed by the processing unit 118 undergo parallel-serial conversion in the P/S conversion unit 119, and are output to an imaged signal processing circuit 507 provided externally to the image pickup device 506.

Here, signal transfer paths between the horizontal signal line 115-a, the horizontal signal line 115-b, the changeover switch 116, the processing unit 118, and the frame memory 117 are digital signal lines provided within an identical chip. This can provide a data bus width necessary for completion of transfer of all horizontal data within a horizontal readout period for higher speed.

FIG. 2 illustrates an example of a data bus configuration from the ADC 111 to the P/S conversion unit 119 in the second chip 11. As illustrated in FIG. 2, in the second chip 11, a column memory 111a is provided between the ADC 111 and the processing unit 118, and the column memory 111a is configured to temporarily hold an output of the digital conversion performed by the ADC 111. It should be noted that the changeover switch 116 is not illustrated in FIG. 2.

Image data held in the column memory 111a provided for each column are divided into the horizontal signal lines 115-a and 115-b and are output in parallel in accordance with a control signal from the horizontal scanning circuit 113. In this case, 16 channels of the horizontal signal lines 115-a and 115-b are provided within the column transfer circuit 115. The image data output to the horizontal signal lines 115-a and 115-b are input to the frame memory 117 through a memory I/F circuit within the processing unit 118.

A case where image data of 8K4K (horizontal 8000 pixels and vertical 4000 pixels) 32M pixels are output from the ADC 111 will be described, for example. Reading out 32M pixel image data at a frame rate of 60 fps may require a data bus band of 1920M pixel/sec.

In a case where each of the 16 channels of the horizontal signal lines 115-a and 115-b provided within the column transfer circuit 115 has a transfer capability of 12 bits, the transfer capability may be required to reduce to a transferable frequency of 120 MHz. A column memory is selected sequentially in accordance with a control signal from the horizontal scanning circuit 113, and image data of 120M pixel/sec per channel in the column transfer circuit 115 are read out in parallel through the 16 channels.

Of the image data input from the column transfer circuit 115 to the frame memory 117 through the processing unit 118, data of a predetermined area are partially read out from the frame memory and are input again to the processing unit 118. For example, the size of the image data output from the frame memory 117 is reduced to 1/16 image size by a reducing magnification circuit within the processing unit 118. The data bus band necessary in this case is reduced to 120M pixel/sec. This is the data transfer capability for reading out full-HD size (2M pixel) image data at 60 fps.

The image data with the reduced data bus band output from the processing unit 118 are converted to serial signals in a 720M-bps double channel configuration by the P/S conversion unit 119 so as not to exceed a maximum serial transfer capability of 1 Gbps and are output.

Providing the ADC 111, processing unit 118, and frame memory 117 within the second chip 11 can provide a wide data bus band necessary for processing image data within the second chip 11, and thus can increase the transfer rate from the ADC 111 to the frame memory 117 while a high quality moving image can be output with serial transfer capability allowing external transfer to the image pickup device.

Figure 3A:
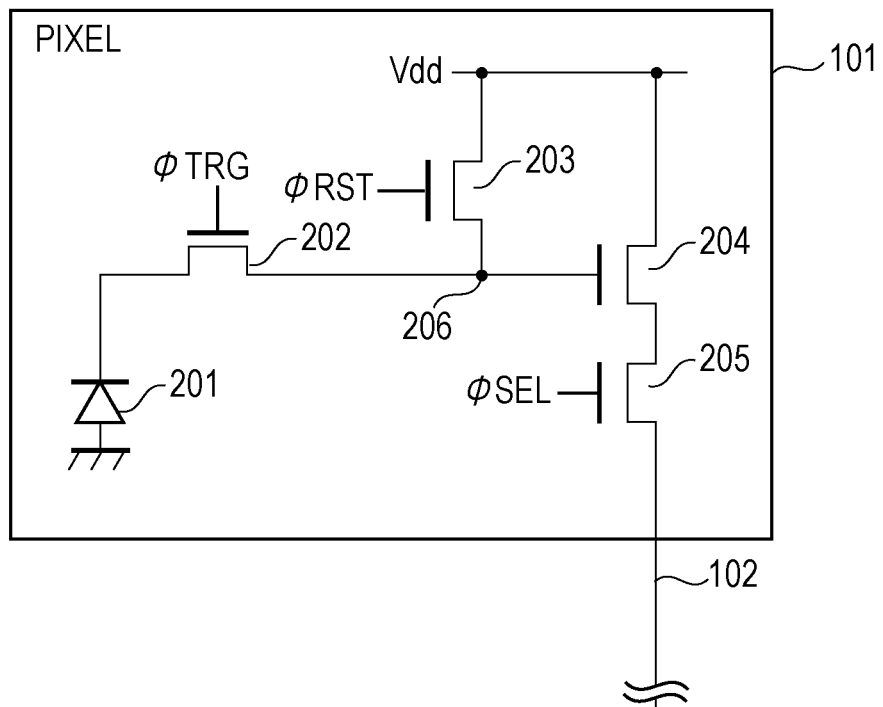
FIGS. 3A and 3B illustrate configurations of a pixel and a column ADC block according to the first embodiment.
Figure 3B:
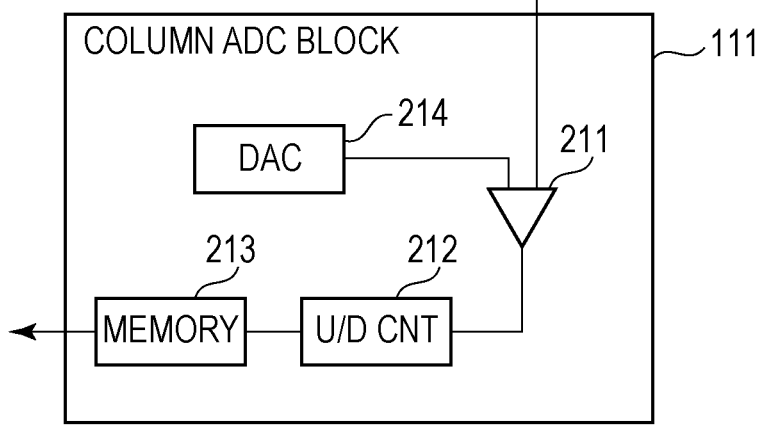

FIGS. 3A and 3B illustrate detail configurations of each pixel 101 in the pixel part and the ADC 111 in the image pickup device 506 according to this embodiment. With reference to FIG. 1 and FIGS. 3A and 3B, operations to be performed by the image pickup device according to the first embodiment will be described schematically.

A photodiode (hereinafter, called a PD) 201 photoelectrically converts received incident light to photo charges (electrons) of the amount of charges corresponding to the amount of light of the received incident light. The PD 201 has a cathode electrically connected to a gate of an amplifying transistor 204 through a transferring transistor 202.

The node electrically connected to the gate of the amplifying transistor 204 configures a floating diffusion (hereinafter, called an FD) unit 206.

The transferring transistor 202 is provided between the cathode of the PD 201 and the FD unit 206 and is turned on in response to supply of a transfer pulse φTRG to its gate through the transfer signal line 103 in FIG. 1. The photo charges photoelectrically converted by the PD 201 are transferred to the FD unit 206.

The reset transistor 203 has a drain connected to a pixel power supply Vdd and a source connected to the FD unit 206 and is turned on in response to supply of a reset pulse φRST to its gate through the reset signal line 104 in FIG. 1. Before the transfer of signal charges from the PD 201 to the FD unit 206, electric charges in the FD unit 206 are disposed to the pixel power supply Vdd so that the FD unit 206 can be reset.

The amplifying transistor 204 has a gate connected to the FD unit 206 and a drain connected to the pixel power supply Vdd and outputs at a reset level the electric potential of the FD unit 206 after the reset by the reset transistor 203. The amplifying transistor 204 outputs at a signal level the electric potential of the FD unit 206 after the signal charges in the PD 201 are transferred by the transferring transistor 202.

The select transistor 205 may have a drain connected to a source of the amplifying transistor 204 and a source connected to a column output line 102. The select transistor 205 is turned on in response to supply of a select pulse φSEL to its gate through the row select signal line 105 in FIG. 1, and outputs to the column output line 102 a signal amplified by the amplifying transistor 204 by changing the pixel 101 to a selected state.

It should be noted that the select transistor 205 may be connected between the pixel power supply Vdd and the drain of the amplifying transistor 204. The transistors 202 to 205 may be N channel MOS transistors, for example. Each of the pixels 101 is not limited to the one including the four transistors but may include three transistor where the amplifying transistor 204 and the select transistor 205 are implemented by one transistor.

An analog image signal output from the pixel 101 through the column output line 102 is transmitted to the ADC 111. The ADC 111 has a comparator 211, an up-down counter 212, a memory 213, and a DA converter (hereinafter, called a DAC) 214.

The comparator 211 has a pair of input terminals one of which is connected to the column output line 102 and the other of which is connected to the DAC 214. The comparator 211 has an output terminal connected to the up-down counter 212. The timing control circuit 114 in FIG. 1 outputs a reference signal to the DAC 214 based on an instruction from the overall control computing unit 509.

The DAC 214 outputs a ramp signal changing its level as time proceeds based on the reference signal input from the timing control circuit 114 in FIG. 1. Then, the comparator 211 compares the level of the ramp signal input from the DAC 214 and the level of the image signal input from the column output line 102.

For example, the comparator 211 outputs a higher level comparison signal if the level of an image signal is lower than the level of the ramp signal, and outputs a lower level comparison signal if the level of the image signal is higher than the level of the ramp signal. The up-down counter 212 counts a period in which the comparison signal is changed to a high-level or a period in which the comparison signal is changed to a low level. The count processing converts the output signals from the pixels 101 to digital values.

Alternatively, an AND circuit may be provided between the comparator 211 and the up-down counter 212. Pulse signals may be input to the AND circuit, and the number of pulse signals may be counted by the up-down counter 212.

The ADC 111 may count a count value corresponding to the reset level based on a reset signal upon reset release of the pixels 101, and may count the count value based on an optical signal after a lapse of a predetermined imaging period. A difference value between the count value associated with the optical signal and the count value associated with the reset signal may be stored in the memory 213.

The memory 213 is connected to the up-down counter 212 and stores the count value counted by the up-down counter 212. The count value stored in the memory 213 is transmitted as digital image data to the horizontal signal line 115-$a$ and horizontal signal line 115-$b$ in FIG. 1 in response to a drive control from the column scanning circuit 113 in FIG. 1.

Figure 4A:
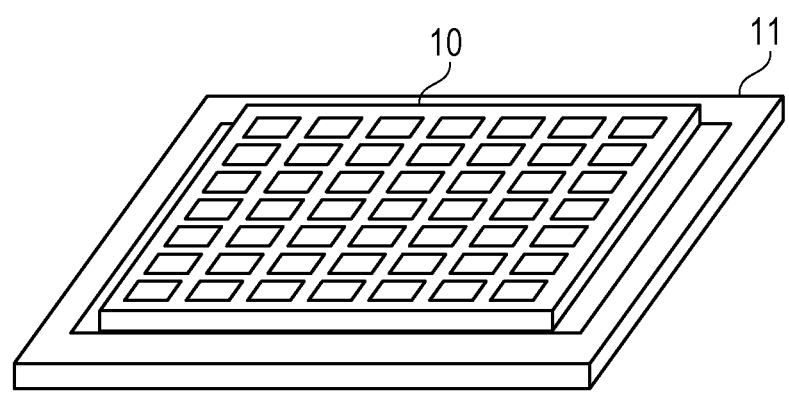
FIGS. 4A and 4B illustrate a stacked configuration of the image pickup device according to the first embodiment.
Figure 4B:
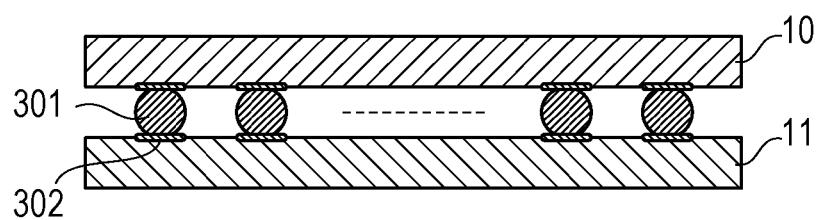

FIGS. 4A and 4B illustrate a configuration of an external form of the image pickup device 506 according to the first embodiment described with reference to FIG. 1. FIG. 4A illustrates a perspective view of the image pickup device 506 from the light incident side, and FIG. 4B illustrates a cross sectional view of the image pickup device 506.

The image pickup device 506 includes the first chip (imaging layer) 10 and a second chip (circuit layer) 11. Each of the first chip 10 and the second chip 11 has a plurality of micro pads 302, and the first chip 10 and the second chip 11 are integrated by electrically connecting the micro pads 302 provided in the first chip 10 and the second chip 11 through a plurality of micro bumps 301. In other words, the first chip 10 and the second chip 11 are directly electrically connected through the plurality of micro bumps 101 and the plurality of micro pads 302. The first chip 10 and the second chip 11 may be directly electrically connected by a method without using the micro pads and micro pads.

Figure 5:
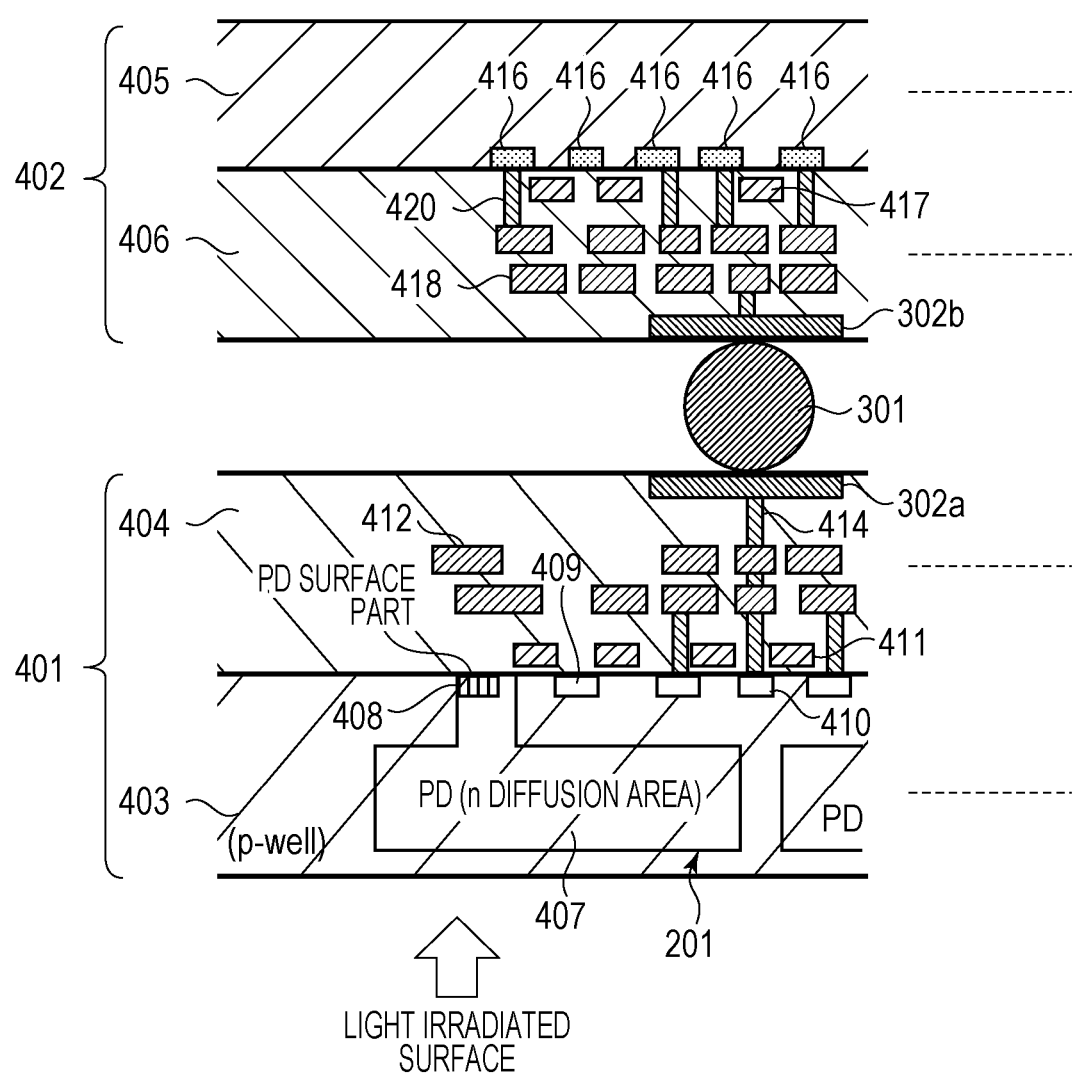
FIG. 5 is a cross sectional view illustrating the image pickup device according to the first embodiment.

FIG. 5 illustrates details of a cross sectional structure of the image pickup device 506 according to the first embodiment illustrated in FIG. 1 to FIGS. 4A and 4B. Referring to FIG. 5, the imaging layer 401 corresponds to the first chip 10, and the circuit layer 402 corresponds to the second chip 11.

In the imaging layer 401, a wiring layer 404 is provided on a silicon (hereinafter, called Si) substrate 403. The Si substrate 403 has an n type diffusion area 407 being the PD 201 and a p+ diffusion area 408 in a surface part (a boundary part with the wiring layer 404 of the wiring layer 404).

The Si substrate 403 has in its surface part a plurality of n+ diffusion area 409 being the FD unit 206 and a plurality of n+ diffusion areas 410 of switching transistors. The wiring layer 404 has a gate line 411 of the transistor and a signal propagation line 412 within an insulating layer of SiO2, for example, and has a micro pad 302$a$ of Cu in its surface part.

The n+ diffusion area 409, the n+ diffusion area 410 and the gate line 411 of the transistors configure the transferring transistor 202, the reset transistor 203, the amplifying transistor 204, and the select transistor 205. The wiring layer 404 has a via 414 for connecting the n+diffusion area 410 to the micro pad 302$a$.

The circuit layer 402 has a wiring layer 406 on the Si substrate 405. The Si substrate 405 has, in its surface part, a plurality of transistor diffusion areas 416. The wiring layer 406 has an insulating layer of SiO2, for example, including a plurality of gate lines 417 for the transistors and a plurality of signal propagation lines 418 and a micro pad 302$b$ of Cu, for example, in the surface part.

The transistor diffusion areas 416, gate lines 417 for the transistors, the signal propagation lines 418 provided in the circuit layer 402 configure circuits. The descriptions of details of the circuit cross section will be omitted. The wiring layer 406 has a via 420 for connecting the diffusion areas 416 and so on to the micro pad 302b.

The micro pad 302a provided in the wiring layer 404 of the imaging layer 401 and the micro pad 302b provided in the wiring layer 406 in the circuit layer 402 are electrically connected with each other through the micro bump 301. Though FIG. 5 illustrates a configuration example in which the imaging layer 401 and the circuit layer 402 are connected by using the micro bump 301 as a connection terminal, they may be connected directly without using the micro bump.

Figure 6:
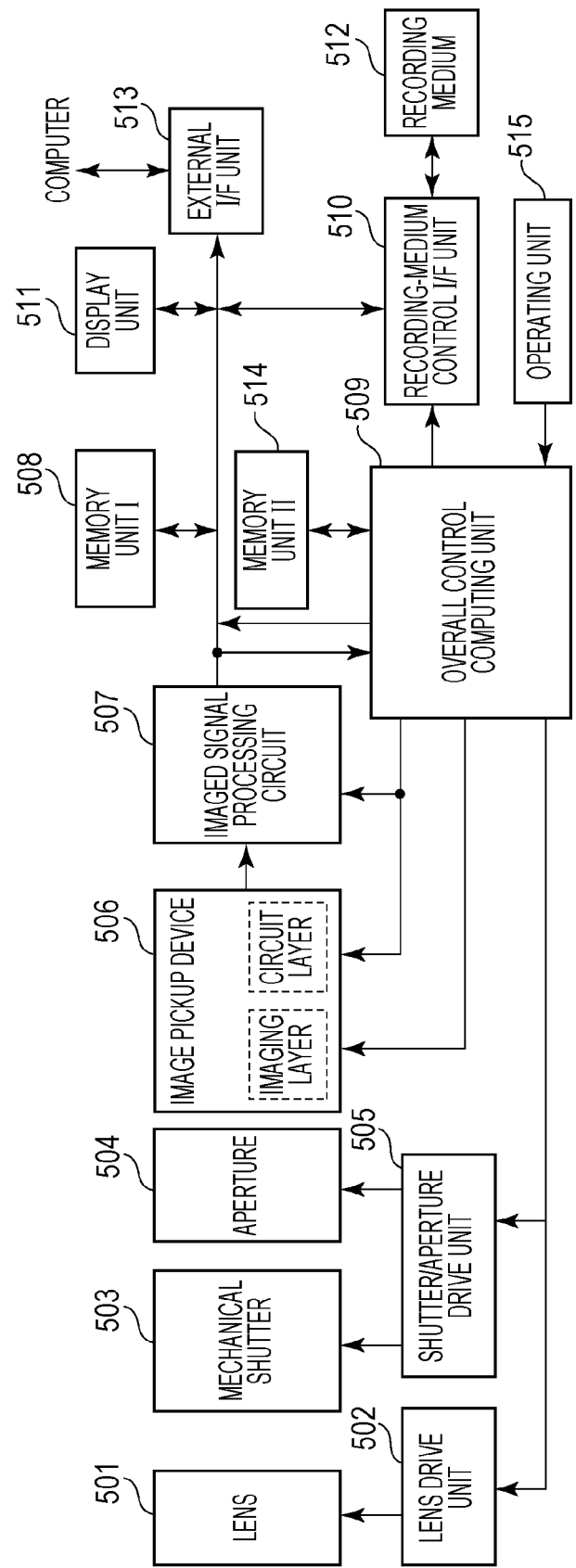
FIG. 6 is a system schematic diagram of an imaging system according to the first embodiment.

FIG. 6 illustrates a system schematic diagram of an imaging apparatus using the image pickup device described with reference to FIGS. 1 to 5. A subject image having passed through a lens unit 501 is adjusted to an appropriate amount of light by an aperture 504, and is focused on an image sensing plane on the image pickup device 506 having the configurations illustrated in FIG. 1 to FIG. 5.

The subject image focused on the image sensing plane on the image pickup device 506 is photoelectrically converted by the PD 201 in the image pickup device 506, and undergoes gain adjustment performed by an amplifier within pixels and a column amplifier provided between the pixels 101 and the ADC 111. The ADC 111 is then used to perform A/D conversion processing from the analog signals to digital signals which are then supplied to the imaged signal processing circuit 507 as digital image signals of colors of R, G, and B.

In the imaged signal processing circuit 507, correction processing such as low-pass filtering and shading correction for noise reduction, image signal processing such as white balance adjustment process, and compression processing on image data are performed. It should be noted that the imaged signal processing circuit 507 configured to perform those processes may be internally contained in the image pickup device 506 having the stacked structure.

The lens unit 501 is driven by the lens drive unit 502 to control zooming and focusing, for example. A mechanical shutter 503 and the aperture 504 are drive controlled by a shutter/aperture drive unit 505.

The overall control computing unit 509 generally controls the imaging apparatus and performs computing processes. A first memory unit 508 temporarily stores image data. A detachable recording medium 512 such as a semiconductor memory records image data. A recording-medium control interface unit 510 records image data in the recording medium 512 or reads out image data recorded in the recording medium 512. It should be noted that the overall control computing unit 509 may be internally contained in the image pickup device 506 having the stacked structure.

A display unit 511 is configured to display image data, for example. An external interface unit 513 is usable for communication with an external computer, for example. A second memory unit 514 temporarily stores a computing result from the overall control computing unit 509 and parameters. Information regarding a driving condition of the imaging apparatus set by a user through the operating unit 515 is transmitted to the overall control computing unit 509 so that the overall imaging apparatus can be controlled based on the information.

Next, with reference to FIG. 1, FIGS. 3A and 3B, and FIG. 7, operating procedures in the imaging system according to this embodiment will be described.

FIG. 7 is a flowchart illustrating a photographing sequence in a photographing mode in which a still image can be captured and be recorded while video recording is being performed in the imaging system according to the first embodiment. FIG. 9 illustrates a method for generating a moving image and a still image from image data acquired by driving the image pickup device 506 in the all pixel readout mode, in a case where a still image of one frame is recorded while a moving image of a plurality of frames are being recorded.

In step S601, parameters are initialized based on settings input by a user through the operating unit 515 in the overall control computing unit 509. The initialized parameters are recorded in the second memory unit 514.

In step S602, the imaging system is driven in a monitor mode in which the captured subject image is displayed on the display unit 511 in real time. More specifically, the image pickup device 506 is driven in a mix/thin-out mode in which a plurality of pixels is combined or partial pixels are thinned out to read out image signals. The read image signals undergo signal processing in the imaged signal processing circuit 507 and are displayed by the display unit 511.

While driving in the monitor mode, a photometry operation for automatic exposure adjustment (AE) control and a distance measurement operation for automatic focus adjustment (AF) control may be performed as required based on the image signals read out from the image pickup device 506. The imaged signal processing circuit 507 then measures the brightness of the subject based on the photometry result and calculates an aperture value Av, and a shutter speed Tv such that the captured image can have a proper brightness. The focal length of the subject image is further calculated based on the distance measurement result.

Though AF control is performed based on contrast information obtained from the image signals read from the image pickup device 506 here, the image pickup device 506 may have a separate focus detection pixel from pixels for imaging. AF control may then be performed based on image plane phase difference detection using phase difference information (defocus amount) obtained from the focus detection pixel. The contrast AF control and the image plane phase difference AF control may be combined for use as required in accordance with a photographing condition and a subject, for example, or the control may be performed to change the AF scheme.

The overall control computing unit 509 gives an instruction to acquire the calculated aperture value Av and shutter speed Tv to the shutter/aperture drive unit 505. The overall control computing unit 509 gives an instruction to acquire the calculated lens position L to the lens drive unit 502. The shutter/aperture drive unit 505 drives the mechanical shutter 503 and the aperture 504 in accordance with the received instruction. The lens drive unit 502 drives the lens 501 based on the given instruction. The calculated aperture value Av, shutter speed Tv, and lens position L are recorded in the second memory unit 514.

The AE control may be performed by differentiating the storage period (exposure period) between rows or pixels of the image pickup device 506 or by differentiating the gain for amplifying the image signals so that images with different exposures in one frame may be acquired for each row or each pixel. Under this control, an HDR image having a wide dynamic range can be generated.

In step S603, the overall control computing unit 509 determines the ON/OFF state of a video recording trigger switch SW_1 in the operating unit 515. If the switch SW_1 has an ON state, the processing moves to step S604. If it has an OFF state, the processing returns to step S602 again.

In step S604, a photographing parameter i is reset to 0.

In step S605, the aperture value Av, shutter speed Tv, and lens position L are read out from the second memory unit 514. An aperture value Av and a shutter speed Tv for acquiring a proper brightness are calculated based on the image data read from the image pickup device 506 and the aperture value Av and shutter speed Tv read out from the second memory unit 514.

A lens position L for acquiring a proper focal length is further calculated from the image data read from the image pickup device 506 and the lens position L read out from the second memory unit 514. The calculated aperture value Av, shutter speed Tv, and lens position L are recorded in the second memory unit 514.

If the photographing parameter i=0, the aperture value Av and shutter speed Tv are re-calculated based on the aperture value Av and shutter speed Tv read out from the second memory unit 514 in consideration of the driving mode in step S606 and the sensitivity difference in the driving mode in step S602. The value of the lens position L read out from the second memory unit 514 is to be used.

If the photographing parameter i ≠0, the aperture value Av, shutter speed Tv, and lens position L read out from the second memory unit 514 are to be used as they are. The overall control computing unit 509 then gives instructions to the lens drive unit 502 and the shutter/aperture drive unit 505 to set the aperture value $Av_i$, shutter speed $Tv_i$, and lens position $L_i$, and so as to drive the lens 501, mechanical shutter 503, and aperture 504.

In step S606, unlike step S602, the image pickup device 506 is driven in the all pixel readout mode in which image signals are read out from all pixels on the image pickup device 506 to perform a photographing operation. Image data of one frame having a first data size acquired by the photographing operation are transmitted to the processing unit 118.

In step S607, the overall control computing unit 509 determines the ON/OFF state of a still image recording trigger switch SW_2 in the operating unit 515. If the switch SW_2 is in an ON state, the processing moves to step S608. If it is in an OFF state, the processing moves to step S609.

In step S608, the processing unit 118 copies the image data of one frame having the first data size captured in step S606, and stores them as image data for a still image in the frame memory 117.

In step S609, the processing unit 118 resizes image data of one frame originally having the first data size for conversion to image data for a moving image of one frame having a second data size smaller than the first data size.

The resize processing may be processing for reducing an image size by performing a mixing/thinning process which mixes or thins out image data of every several rows or columns in a horizontal direction (row direction) or a vertical direction (column direction), or an area cut-out process which only uses a partial area of the image data. Alternatively, a process may be performed which changes the bit data amount of each pixel of image data to a smaller size (such as changing from 16 bits to 10 bits).

FIGS. 8A1 to 8B2 illustrate examples of the mixing/thinning process and the area cut-out process. FIGS. 8A1 to 8A3 illustrate processing for performing horizontal three pixels mixing and vertical 1/3 pixels thinning as examples of the mixing/thinning process, and FIGS. 8B1 and 8B2 illustrate an example area cut-out process.

The mixing/thinning process only uses pixel data illustrated in FIG. 8A2 to calculate Expressions (1) to (4) for the image data having the first data size illustrated in FIG. 8A1. By calculating data R', Gr', Gb', and B' after the mixing/thinning process, image data having the second data size are generated.

$$R'=(R+R+R)/3 \tag{1}$$

$$Gr'=(Gr+Gr+Gr)/3 \tag{2}$$

$$Gb'=(Gb+Gb+Gb)/3 \tag{3}$$

$$B'=(B+B+B)/3 \tag{4}$$

The area cut-out process generates image data having the second data size shown in FIG. 8A2 by only using pixel data in an area enclosed by the broken line in FIG. 8B1 excluding vertical and horizontal, upper and lower and right and left several to several hundreds pixels for the image data having the first data size in FIG. 8B1.

In step S610, the image data resized to the second data size in step S609 undergo parallel/serial conversion processing in the parallel/serial conversion unit 119, and are then transferred to the imaged signal processing circuit 507. Here, the image data output from the P/S conversion unit 119 have a data size and a frame rate, for example, set to be equal to or lower than the output transfer capacity of the image pickup device 506.

It is assumed here that the number of pixels of the image data having the first data size is equal to 24 million pixels and that the data amount of each pixel is equal to 12 bits. It is further assumed that data are to be transmitted through eight ports from the P/S conversion unit 119 in the image pickup device 506 to the imaged signal processing circuit 507, and that the output transfer capacity from the image pickup device 506 to the imaged signal processing circuit 507 is equal to 1 Gbps.

It is further assumed that image data having the second data size is acquired by performing the resize processing including the horizontal 3 pixel addition and vertical 1/3 pixel thinning illustrated in FIGS. 8A1 to 8B2, and that the number of pixels is equal to 2 million pixels and the data amount of each pixel is equal to 12 bits. Here, 360 Mbps is necessary in a case where the frame rate of a moving image is equal to 120 fps and data are transmitted through eight ports from the P/S conversion unit 119 in the image pickup device 506 to the imaged signal processing circuit 507. Because the output transfer capacity from the image pickup device 506 to the imaged signal processing circuit 507 is equal to 1 Gbps, image data for a moving image can be transferred with enough margin.

In step S611, the imaged signal processing circuit 507 performs processes on image data resized in step S609 in response to an instruction from the overall control computing unit 509 and transferred in step S610. The processes to be performed in the imaged signal processing circuit 507 may include image signal processing such as a low-pass filter process for reducing noise, a defect pixel correction process, a shading correction process, and a white balance process, developing processing, image data compression processing, for example. The image data having undergone such processes are recorded as a moving image in the recording medium 512.

In step S612, 1 is added to the photographing parameter i. In step S613, the overall control computing unit 509 determines the ON/OFF state of the switch SW_1. If the switch SW_1 is in an ON state, it is determined that an instruction to record a still image has been given, and the processing then moves to step S614. If it is in an OFF state, the processing returns to step S605.

In step S614, the image data for a still image having the first data size, which are stored in the frame memory 117 in step S608, undergo the parallel/serial conversion processing in the P/S conversion unit 119 and are transferred to the imaged signal processing circuit 507.

It should be noted that the image data for a still image output from the P/S conversion unit 119 have a data size and a frame rate, for example, set to be equal to or lower than the output transfer capacity of the image pickup device 506.

It is assumed here that the number of pixels of the image data having the first data size is equal to 24 million pixels and that the data amount of each pixel is equal to 12 bits. 864 Mbps is necessary in a case where the frame rate is set to be equal to 24 fps and data are transmitted from the P/S conversion unit 119 to the imaged signal processing circuit 507 through eight ports. Because the output transfer capacity from the image pickup device 506 to the imaged signal processing circuit 507 is equal to 1 Gbps, image data for a still image can be transferred with a margin.

In step S615, the imaged signal processing circuit 507 performs processes on image data having the first data size transferred in step S614 in response to the instruction from the overall control computing unit 509.

The processes to be performed in the imaged signal processing circuit 507 may include image signal processing such as a low-pass filter process for reducing noise, a defect pixel correction process, a shading correction process, and a white balance process, developing processing, image data compression processing, for example. The image data having undergone such processes are recorded as a still image in the recording medium 512. The moving image recorded in the storage medium 512 in step S611 undergoes post-processing and is then stored in a predetermined moving image format.

As described above, the data size of an image data for a moving image is reduced from the first data size to the second data size within the image pickup device, and the resulting image data are transferred to a subsequent stage in the image pickup device. Image data for a still image having the larger first data size are temporarily stored in the frame memory in the image pickup device and are transferred to a subsequent stage in the image pickup device after the image data for a moving image are transferred thereto.

Thus, in an imaging system including the image pickup device having a larger number of pixels, a seamless moving image having a high frame rate can be acquired even in a case where still image recording is performed while video recording is being performed. During the recording, still images can be captured at a high shutter speed. Thus, high quality images can be obtained without significant rolling shutter distortions inherent to a CMOS image sensor.

The method according to this embodiment has been described in which a moving image and still images are generated from image signals by driving the image pickup device 506 at all times in the all pixel readout mode as illustrated in FIG. 7. However, as illustrated in FIG. 10, the image pickup device 506 may normally be driven in the horizontal 3 pixel mixing and vertical 1/3 pixel thinning mode to capture a moving image. Then, the image pickup device 506 may be driven in the all pixel readout mode only in response to an instruction for still image recording. In this case, image data having the first data size obtained in the all pixel readout mode are resized to generate image data for a moving image having the second data size, and the image data having the first data size may be used as the image data for a still image.

Second Embodiment

Figure 11:
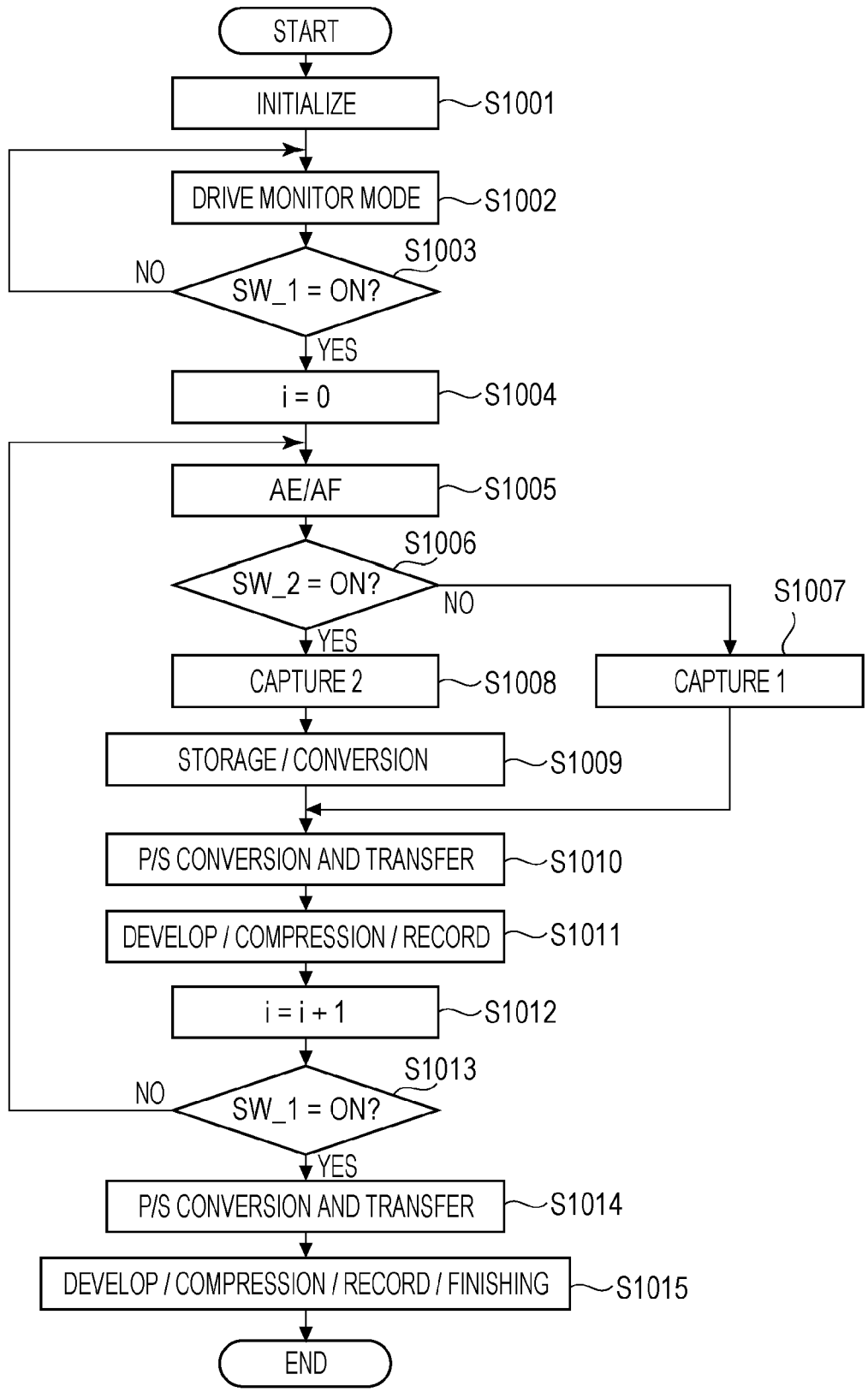
FIG. 11 is a flowchart illustrating a photographing sequence according to second and third embodiments.
Figure 12:
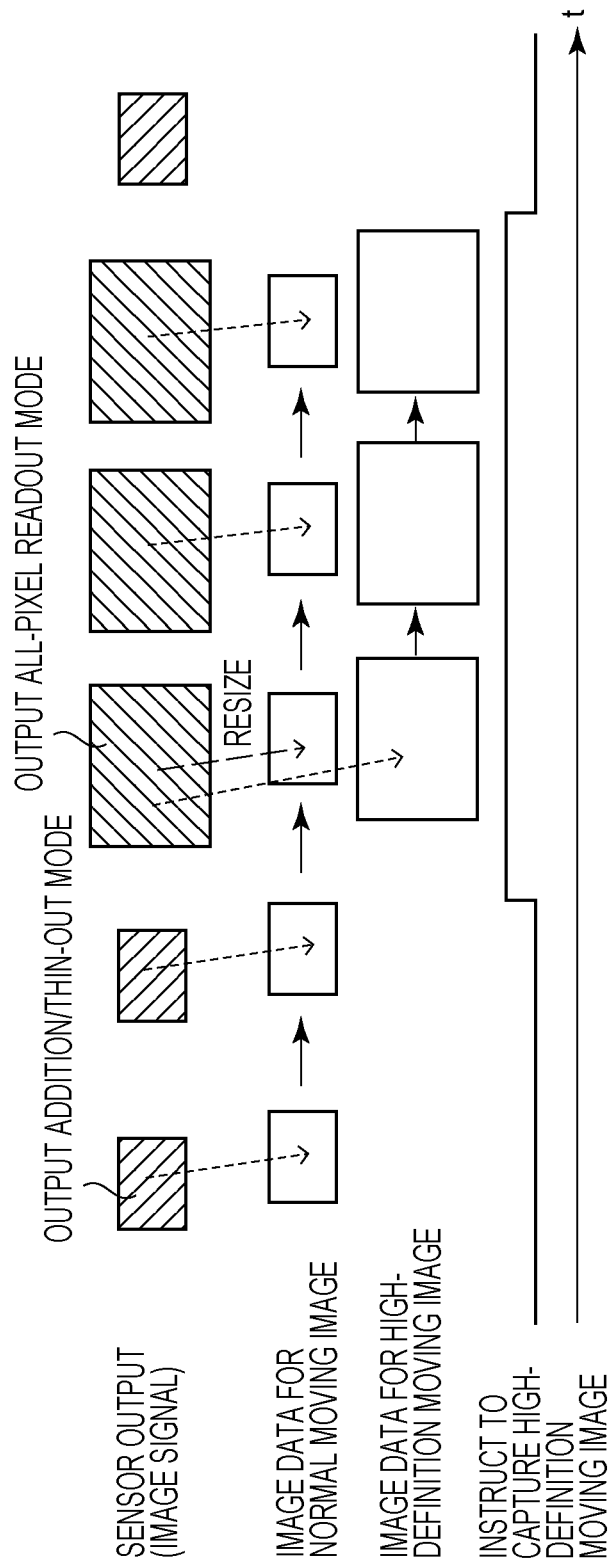
FIG. 12 illustrates an outline of image data size changing processing according to the second embodiment.

With reference to FIGS. 11 and 12, a second embodiment of the present invention will be described. According to the second embodiment, an imaging system will be described which has a photographing mode in which a high-definition moving image can be captured while normal video recording is being performed.

Because the configuration of an image pickup device therein is the same as described with reference to FIGS. 1 to 5 according to the first embodiment, the description will be omitted. Because the outline of the imaging system is also the same as the one described with reference to FIG. 6 according to the first embodiment, the description will be omitted. Because the resize processing to be performed in image data is the same as the one described with reference to FIGS. 8A1 to 8B2 according to the first embodiment, the description will be omitted.

FIG. 11 is a flowchart illustrating a photographing sequence in the imaging system according to the second embodiment. FIG. 12 illustrates a method for generating a high-definition moving image by driving the image pickup device 506 in the all pixel readout mode, in response to an instruction for high-definition video recording while normal video recording is being performed according to this embodiment.

Because the processing in step S1001 to step S1005 is the same as the processing in step S601 to step S605 illustrated in FIG. 7 according to the first embodiment, the description will be omitted.

In step S1006, the switch SW_2 in the operating unit 515 is used as a trigger switch for high-definition video recording. In other words, the overall control computing unit 509 determines the ON/OFF state of the switch SW_2. If the switch SW_2 is in an ON state, the processing moves to step S1007. If it is in an OFF state, the processing moves to step S1008.

In step S1007, in order to capture a normal moving image in a first video recording mode, the image pickup device 506 is driven in a horizontal 3 pixel mixing and vertical 1/3 pixel thinning mode to perform a photographing operation. Image data of one frame having a second data size acquired by the photographing operation are transmitted to the P/S conversion unit 109 through the processing unit 118.

In step S1008, in order to capture a high-definition moving image in a second video recording mode, the image pickup device 506 drives in the all pixel readout mode to perform a photographing operation. Image data of one frame having a first data size acquired by the photographing operation are transmitted to the processing unit 118.

In step S1009, the processing unit 118 copies the image data of one frame having the first data size captured in step S1008, and stores them as image data for a high-definition moving image in the frame memory 117. The processing unit 118 resizes image data of one frame originally having the first data size for conversion to image data for a normal moving image of one frame having a second data size smaller than the first data size.

In step S1010, the P/S conversion unit 119 performs parallel/serial conversion processing on the image data having the second data size captured in step S1007, or the image data having the second data size as a result of the resize processing to the second data size in step S1009. Then, the resulting data are transferred to the imaged signal processing circuit 507.

It is assumed that the number of pixels of the image data having the second data size to be transferred from the P/S conversion unit 119 to the imaged signal processing circuit 507 in step S1010 is 2 million pixels, and that the data amount of each pixel is equal to 12 bits. It is further assumed that the frame rate of a moving image is equal to 120 fps, and data are transmitted through eight ports from the P/S conversion unit 119 in the image pickup device 506 to the imaged signal processing circuit 507, and that the output transfer capacity from the image pickup device 506 to the imaged signal processing circuit 507 is equal to 1 Gbps. In this case, because the data size is equal to that of the data to be transferred in step S610 in the first embodiment, the image data for a normal moving image can be transferred with a sufficient margin.

Because the processing in step S1011 to step S1013 is the same as the processing in step S611 to step S613 illustrated in FIG. 7 according to the first embodiment, the description will be omitted.

In step S1014, the P/S conversion unit 119 performs parallel/serial conversion processing on the image data for a high-definition moving image having the first data size stored in the frame memory 117 in step S1009, and the resulting data are transferred to the imaged signal processing circuit 507.

It should be noted that the image data for a high-definition moving image output from the P/S conversion unit 119 have a data size and a frame rate set to be equal to or lower than the output transfer capacity of the image pickup device 506.

It is assumed here that the number of pixels of the image data having the first data size is equal to 24 million pixels and that the data amount of each pixel is equal to 12 bits. 864 Mbps is necessary in a case where the frame rate is set to be equal to 24 fps and data are transmitted from the P/S conversion unit 119 to the imaged signal processing circuit 507 through eight ports. Because the output transfer capacity from the image pickup device 506 to the imaged signal processing circuit 507 is equal to 1 Gbps, image data for a high-definition moving image can be transferred with a margin.

In step S1015, the imaged signal processing circuit 507 performs processes on image data having the first data size transferred in step S1014 in response to the instruction from the overall control computing unit 509.

The processes to be performed in the imaged signal processing circuit 507 may include image signal processing such as a low-pass filter process for reducing noise, a defect pixel correction process, a shading correction process, and a white balance process, developing processing, image data compression processing, and post-processing, for example. The image data having undergone such processes are recorded in the recording medium 512. A moving image to be recorded here is a high-definition moving image corresponding to an entire effective imaging region (full screen) of the image pickup device at a frame rate as high as 120 fps.

In step S1011, the moving image recorded in the storage medium 512 undergoes post-processing, and is stored as a moving image of 120 fps corresponding to a predetermined moving image format having an image size smaller than the image size of the full screen.

As described above, according to this embodiment, the image pickup device 506 is driven in the horizontal 3 pixel mixing and vertical 1/3 pixel thinning mode, as illustrated in FIG. 12, and only in response to an instruction for high-definition video recording, the image pickup device 506 is driven in the all pixel readout mode. Then, a normal moving image can be generated from the image data having the second data size acquired by driving the image pickup device 506 in the horizontal 3 pixel mixing and vertical 1/3 pixel thinning mode, and the image data having the second data size acquired by resizing the image data having the first data size acquired by driving the image pickup device 506 in the all pixel readout mode. A high-definition moving image can be generated from the image data having the first data size acquired in the all pixel readout mode.

With the configuration as described above, a seamless normal moving image and high-definition moving image having a high frame rate can be acquired even in a case where a high-definition moving image is captured while normal video recording is being performed in an imaging system including an image pickup device having a large number of pixels.

Third Embodiment

A third embodiment of the present invention will be described below with reference to FIGS. 11 and 13. Having described the method for capturing a high-definition moving image while normal video recording is being performed according to the second embodiment, a method for capturing a high speed moving image having a higher (about 8 time) frame rate than the normal frame rate while normal video recording is being performed according to the third embodiment will be described below.

Because the configuration of the image pickup device, the outline of the imaging system, and the resize processing to be performed on image data are the same as those of the first and second embodiments, the description will be omitted. A flowchart of a photographing sequence according to this embodiment will be described with reference to FIG. 11 also referred in the description of the second embodiment. FIG. 13 illustrates a method for generating a high speed moving image having a high frame rate while normal video recording is being performed according to this embodiment.

Because the processing in step S1001 to step S1005 and step S1007 is the same as the processing for capturing a high-definition moving image while video recording is being performed according to the second embodiment, the description will be omitted.

In step S1006, a switch SW_2 in the operating unit 515 is used as a trigger switch for high-speed video recording. In other words, the overall control computing unit 509 determines the ON/OFF state of the switch SW_2. If the switch SW_2 is in an ON state, the processing moves to step S1007. If it is in an OFF state, the processing moves to step S1008.

In step S1008, in order to capture a moving image having a high frame rate in a second movie mode, the image pickup device 506 is driven in the horizontal 3 pixel mixing and vertical 1/3 pixel thinning mode, and at a frame rate eight times higher than a normal frame rate to perform a photographing operation. If the normal frame rate is 120 fps, the image pickup device 506 is driven at 960 fps. The image data of one frame having the second data size acquired by the photographing operation is transmitted to the processing unit 118.

In step S1009, the processing unit 118 copies the image data having the second data size captured in step S1008 and stores them as image data for a high frame rate moving image in the frame memory 117. The processing unit 118 further performs processing including thinning out seven frames from every eight frames in the original image data having the second data size for conversion to image data having the second data size of the frame rate reduced from 960 fps to 1/8 or 120 fps.

In step S1010, the image data (having a frame rate of 120 fps) having the second data size captured in step S1007 undergo the parallel/serial conversion processing in the P/S conversion unit 119. Alternatively, the image data having the second data size at the frame rate changed from 960 fps to 120 fps in step S1009 undergo the parallel/serial conversion processing in the P/S conversion unit 119. The resulting data are transferred to the imaged signal processing circuit 507.

Because the processing in step S1011 to step S1013 is the same as the one according to the second embodiment, the description will be omitted.

In step S1014, the image data for a high frame rate moving image having the second data size stored in the frame memory 117 in step S1009 undergo the parallel/serial conversion processing in the P/S conversion unit 119 and are transferred to the imaged signal processing circuit 507.

Here, the number of pixels of the image data having the second data size is 2 million pixels and the data amount of each pixel is 12 bits. However, because the image data are captured at 960 fps, 2.88 Gbps are required in a case where data are transmitted from the P/S conversion unit 119 to the imaged signal processing circuit 507 through eight ports. This means that an output transfer capability of 1 Gbps from the image pickup device 506 to the imaged signal processing circuit 507 is not sufficient.

However, a transfer capability of 360 Mbps may be sufficient in a case where the frame rate may be reduced from 960 fps to 1/8 or 120 fps to transfer data from the image pickup device 506 to the imaged signal processing circuit 507. Here, because the output transfer capacity from the image pickup device 506 to the imaged signal processing circuit 507 is equal to or lower than 1 Gbps, image data for a high frame rate moving image can be transferred with a sufficient margin.

In step S1015, the imaged signal processing circuit 507 performs processes on image data having the second data size transferred in step S1014 in response to the instruction from the overall control computing unit 509.

The processes to be performed in the imaged signal processing circuit 507 may include image signal processing such as a low-pass filter process for reducing noise, a defect pixel correction process, a shading correction process, and a white balance process, developing processing, image data compression processing, and post-processing, for example. The image data having undergone such processes are recorded in the recording medium 512. A moving image to be recorded here is a high frame rate moving image having a frame rate of play of 960 fps corresponding to a predetermined moving image format.

In step S1011, the moving image recorded in the storage medium 512 undergoes post-processing and is stored as a moving image of a frame rate of play of 120 fps corresponding to a predetermined moving image format.

Figure 13:
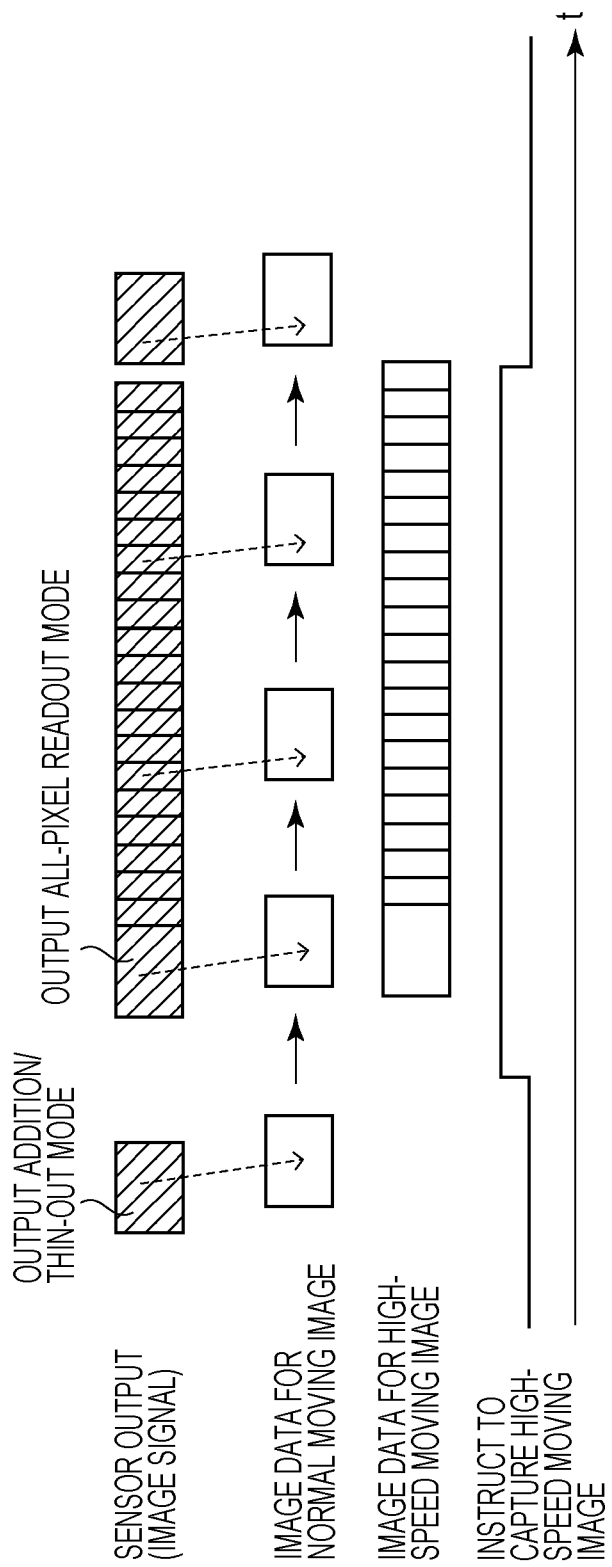
FIG. 13 illustrates an outline of image data size changing processing according to the third embodiment.
Figure 14:
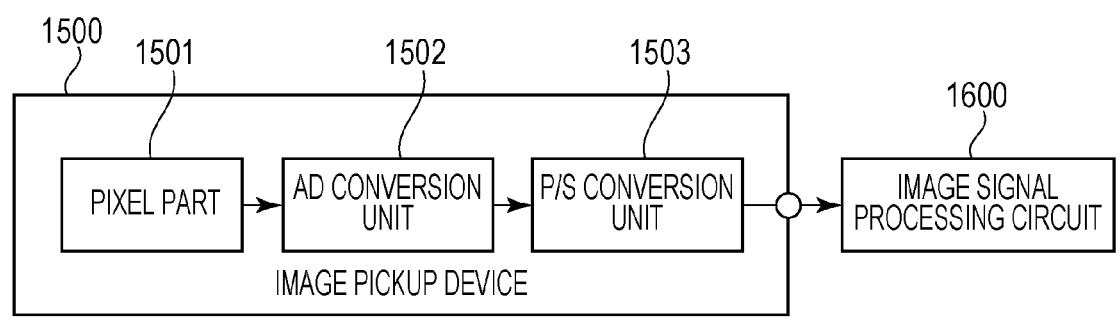
FIG. 14 illustrates a configuration of a general imaging apparatus.

As described above, according to this embodiment, the image pickup device 506 is driven in the horizontal 3 pixel mixing and vertical 1/3 pixel thinning mode and at 120 fps, as illustrated in FIG. 13. Only in response to an instruction for high speed video recording, the image pickup device 506 is driven in the horizontal 3 pixel mixing and vertical 1/3 pixel thinning mode and at a frame rate of 960 fps.

Then, a normal 120 fps moving image is generated from the image data having the second data size acquired by capture in the horizontal 3 pixel mixing and vertical 1/3 pixel thinning mode and at 120 fps, and the image data having the second data size acquired by thinning out a plurality of frames from the image data acquired by capturing at 960 fps to 120 fps. A high speed moving image having 960 fps can be generated from the image data having the second data size acquired by performing a photographing operation at 960 fps.

With the configuration as described above, a seamless normal moving image, and high speed moving image having a high frame rate, can be acquired even in a case where a high speed moving image is captured while normal video recording is being performed in an imaging system including an image pickup device having a large number of pixels.

Having described embodiments of the present invention, the present invention is not limited to those embodiments and can be modified and changed variously without departing from the spirit and scope.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s), and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s), and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image sensor comprising:
   an imaging portion that photoelectrically converts incident light;
   a plurality of analog to digital converters that convert analog image signals output from the imaging portion to digital image data;
   a memory that stores digital image data of at least one frame converted by the plurality of analog to digital converters;
   a processor that changes a data size of the digital image data converted by the plurality of analog to digital converters; and an output portion that outputs the digital image data,
wherein the processor generates second digital image data from first digital image data, a data size of the second image data is smaller than that of the first digital image data, and wherein the first digital image data is stored in the memory, and the second digital image data is possible to be output from the image sensor via the output portion in priority to the first digital image data in a case where the output portion outputs the first digital image data and the second digital image data from the image sensor.

2. The image sensor according to claim 1, wherein the digital image data is transferred in parallel from the plurality of analog to digital converters to the memory.

3. The image sensor according to claim 1, wherein a size of the digital image data is set corresponding to an output transfer capacity of the image sensor.

4. The image sensor according to claim 1, wherein the second digital image data is possible to be output via the output portion without being stored in the memory.

5. The image sensor according to claim 1, wherein the first digital image data is possible to be output after the second digital image data is output.

6. The image sensor according to claim 1, wherein the first digital image data is for a still image, and the second digital image data is for a moving image.

7. The image sensor according to claim 1, wherein the second digital image data is possible to be output after the first digital image data is output.

8. The image sensor according to claim 1, wherein a frame rate of the digital image data is determined based on an output transfer capacity of the image sensor.

9. The image sensor according to claim 1, wherein the output portion converts the digital image data to a serial digital signal before outputting the digital image data.

10. The image sensor according to claim 1, further comprising:
a plurality of semiconductor substrates stacked on each other,
wherein at least one of the memory and the processor is arranged on one of the plurality of semiconductor substrates different from that the imaging portion is arranged on.

11. The image sensor according to claim 10,
wherein the memory and the processor are arranged on one of the plurality of semiconductor substrates different from that the imaging portion is arranged on.

12. An image sensor comprising:
an imaging portion that photoelectrically converts incident light;
a plurality of analog to digital converters that convert analog image signals output from the imaging portion to digital image data;
a memory that stores digital image data of at least one frame converted by the plurality of analog to digital converters;
a processor that changes a resolution of the digital image data converted by the plurality of analog to digital converters; and
an output portion that outputs the digital image data,
wherein the processor generates second digital image data from first digital image data, a resolution of the second image data is lower than that of the first digital image data, and the first digital image data is stored in the memory, and the second digital image data is possible to be output from the image sensor via the output portion in priority to the first digital image data in a case where the output portion outputs the first digital image data and the second digital image data from the image sensor.

13. The image sensor according to claim 12, wherein the digital image data is transferred in parallel from the plurality of analog to digital converters to the memory.

14. The image sensor according to claim 12, wherein the second digital image data is possible to be output by the output portion without being stored in the memory.

15. The image sensor according to claim 12, wherein the first digital image data is possible to be output after the second digital image data is output.

16. The image sensor according to claim 12, wherein the first digital image data is for a still image, and the second digital image data is for a moving image.

17. The image sensor according to claim 12, wherein the second digital image data is possible to be output after the first digital image data is output.

18. The image sensor according to claim 12, wherein the frame rate of the digital image data is determined based on an output transfer capacity of the image sensor.

19. The image sensor according to claim 12, wherein the output portion converts the digital image data to a serial digital signal before outputting the digital image data.

20. The image sensor according to claim 12, further comprising:
a plurality of semiconductor substrates stacked on each other,
wherein at least one of the memory and the processor is arranged on one of the plurality of semiconductor substrates different from that the imaging portion is arranged on.

21. The image sensor according to claim 20,
wherein the memory and the processor are arranged on one of the plurality of semiconductor substrates different from that the imaging portion is arranged on.

22. An image sensor comprising:
an imaging portion that photoelectrically converts incident light;
a plurality of analog to digital converters that convert analog image signals output from the imaging portion to digital image data;
a memory that stores digital image data of at least one frame converted by the plurality of analog to digital converters; and
an output portion that outputs the digital image data,
wherein second digital image data corresponding to second moving images is stored in the memory, and first digital image data corresponding to first moving images is possible to be output from the image sensor via the output portion in priority to the second digital image data in a case where the first moving images and the second moving images are shot by the imaging portion, a frame rate of the second moving images is higher than that of the first moving images, and the output portion outputs the first digital image data and the second digital image data from the image sensor.

23. The image sensor according to claim 22, wherein the digital image data is transferred in parallel from the plurality of analog to digital converters to the memory.

24. The image sensor according to claim 22, wherein the first digital image data is possible to be output via the output portion without being stored in the memory.

25. The image sensor according to claim 22, wherein the frame rate of the digital image data is determined based on an output transfer capacity of the image sensor.

26. The image sensor according to claim 22, wherein the output portion converts the digital image data to a serial digital signal before outputting the digital image data.

27. The image sensor according to claim 22, further comprising:
a plurality of semiconductor substrates stacked on each other,
wherein at least one of the memory and the processor is arranged on one of the plurality of semiconductor substrates different from that the imaging portion is arranged on.

28. The image sensor according to claim 27,
wherein the memory and the processor are arranged on one of the plurality of semiconductor substrates different from that the imaging portion is arranged on.

29. An image pickup apparatus comprising:
an image sensor having an imaging portion that photoelectrically converts incident light, a plurality of analog to digital converters that convert analog image signals output from the imaging portion to digital image data, a memory that stores digital image data of at least one frame converted by the plurality of analog to digital converters, a processor that changes a data size of the digital image data converted by the plurality of analog to digital converters, and an output portion that outputs the digital image data;
a signal processor that performs a predetermined signal process on image data output from the image sensor;
a display that displays an image; and
a controller that controls the image sensor, the signal processor, and the display,
wherein the processor generates second digital image data from first digital image data, a data size of the second image data is smaller than that of the first digital image data, and wherein the first digital image data is stored in the memory, and the second digital image data is possible to be output from the image sensor via the output portion in priority to the first digital image data in a case where the output portion outputs the first digital image data and the second digital image data from the image sensor.

30. An image pickup apparatus comprising:
an image sensor having an imaging portion that photoelectrically converts incident light, a plurality of analog to digital converters that convert analog image signals output from the imaging portion to digital image data, a memory that stores digital image data of at least one frame converted by the plurality of analog to digital converters, a processor that changes a resolution of the digital image data converted by the plurality of analog to digital converters, and an output portion that outputs the digital image data;
a signal processor that performs a predetermined signal process on image data output from the image sensor;
a display that displays an image; and
a controller that controls the image sensor, the signal processor, and the display,
wherein the processor generates second digital image data from first digital image data, a resolution of the second image data is lower than that of the first digital image data, and the first digital image data is stored in the memory, and the second digital image data is possible to be output from the image sensor via the output portion in priority to the first digital image data in a case where the output portion outputs the first digital image data and the second digital image data from the image sensor.

31. An image pickup apparatus comprising:
an image sensor having an imaging portion that photoelectrically converts incident light, a plurality of analog to digital converters that convert analog image signals output from the imaging portion to digital image data, a memory that stores digital image data of at least one frame converted by the plurality of analog to digital converters, and an output portion that outputs the digital image data;
a signal processor that performs a predetermined signal process on image data output from the image sensor;
a display that displays an image; and
a controller that controls the image sensor, the signal processor, and the display,
wherein second digital image data corresponding to second moving images is stored in the memory, and first digital image data corresponding to first moving images is possible to be output from the image sensor via the output portion in priority to the second digital image data in a case where the first moving images and the second moving images are shot by the imaging portion, a frame rate of the second moving images is higher than that of the first moving images, and the output portion outputs the first digital image data and the second digital image data from the image sensor.

* * * * *